United States Patent
Vemuri et al.

(10) Patent No.: US 11,117,573 B2
(45) Date of Patent: Sep. 14, 2021

(54) METHOD AND APPARATUS FOR OBJECT IDENTIFICATION USING NON-CONTACT CHEMICAL SENSOR

(71) Applicant: GM GLOBAL TECHNOLOGY OPERATIONS LLC, Detroit, MI (US)

(72) Inventors: Vikas Vemuri, Novi, MI (US); Ashhad Mohammed, Farmington Hills, MI (US); Andrew J. MacDonald, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 100 days.

(21) Appl. No.: 16/659,648

(22) Filed: Oct. 22, 2019

(65) Prior Publication Data

US 2021/0114592 A1 Apr. 22, 2021

(51) Int. Cl.
| | |
|---|---|
| *B60W 30/095* | (2012.01) |
| *G08B 21/12* | (2006.01) |
| *B62D 15/02* | (2006.01) |
| *B60W 30/18* | (2012.01) |
| *G01N 23/222* | (2006.01) |
| *H04L 29/08* | (2006.01) |
| *G06K 9/00* | (2006.01) |
| *G01V 8/00* | (2006.01) |
| *G01S 17/86* | (2020.01) |

(52) U.S. Cl.
CPC .... *B60W 30/0956* (2013.01); *B60W 30/0953* (2013.01); *B60W 30/18109* (2013.01); *B60W 30/18163* (2013.01); *B62D 15/0265* (2013.01); *G01N 23/222* (2013.01); *G01S 17/86* (2020.01); *G01V 8/005* (2013.01); *G06K 9/00805* (2013.01); *G08B 21/12* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,234,618 B1 * | 1/2016 | Zhu | G01S 7/497 |
| 2018/0032075 A1 * | 2/2018 | Valois | G05D 1/0088 |
| 2019/0277962 A1 * | 9/2019 | Ingram | G01S 17/931 |

* cited by examiner

*Primary Examiner* — Jonathan M Dager
*Assistant Examiner* — Garrett F Evans
(74) *Attorney, Agent, or Firm* — Quinn IP Law

(57) ABSTRACT

A method and apparatus that identify a composition of an object using a non-contact chemical sensor provided. The method includes detecting an object based on information provided by a plurality of sensors, transmitting a chemical detection signal, from a non-contact chemical sensor, at the detected object, identifying a composition of the detected object based on an attenuation of the chemical detection signal, determining whether a path change is required based on the identified composition of the detected object, and controlling one or more actuators to stop a vehicle or adjust the path of the vehicle if the path change is required.

12 Claims, 3 Drawing Sheets

METHOD AND APPARATUS FOR OBJECT IDENTIFICATION USING NON-CONTACT CHEMICAL SENSOR

INTRODUCTION

Apparatuses and methods consistent with exemplary embodiments relate to detecting objects while controlling a vehicle. More particularly, apparatuses and methods consistent with exemplary embodiments relate to identifying solid objects, gases and liquids.

SUMMARY

One or more exemplary embodiments provide a method and an apparatus that differentiate between a solid object and gaseous or liquid composition using a non-contact chemical sensor. More particularly, one or more exemplary embodiments provide a method and an apparatus that differentiate between a solid object and a gaseous or liquid composition using a non-contact chemical sensor and control a vehicle to travel through the gaseous or liquid composition and to stop or travel around a solid object.

According to an exemplary embodiment, a method that identifies an object using a non-contact chemical sensor is provided. The method includes detecting an object based on information provided by a plurality of sensors, transmitting a chemical detection signal, from a non-contact chemical sensor, at the detected object, identifying a composition of the detected object based on reflections of the chemical detection signal, determining whether a path change is required based on the identified composition of the detected object, and controlling one or more actuators to stop a vehicle or to adjust the path of the vehicle if the path change is required.

The transmitting the chemical detection signal may include transmitting a millimeter wave signal and the chemical detection signal may be a signal between 30 GHz and 300 GHz.

The identifying the composition of the detected object based on the reflections of the chemical detection signal may include determining whether an attenuation or strength of the reflections of the chemical detection signal within a preset range corresponding to a composition.

The composition may include one from among a gaseous composition, a solid composition and a liquid composition.

The determining whether the path change is required based on the identified composition of the detected object may include determining whether an attenuation or strength of the reflections of the chemical detection signal is greater than a preset threshold.

The controlling one or more actuators may include activating brakes to stop a vehicle if the path change that is required is a vehicle stop.

The controlling one or more actuators may include providing an electronic power steering single to direct a vehicle on a modified path if the path change that is required is to drive around the identified object.

The plurality of sensors may include two or more from among a LIDAR, a camera, a sonar, and a radar.

The identifying the composition of the detected object based on the reflections of the chemical detection signal may include comparing a profile of the reflections of the chemical detection signal to a spectral profile corresponding to the composition.

According to an exemplary embodiment, an apparatus that identifies an object using a non-contact chemical sensor is provided. The apparatus includes at least one memory comprising computer executable instructions; and at least one processor configured to read and execute the computer executable instructions. The computer executable instructions may cause the at least one processor to detect an object based on information provided by a plurality of sensors, control to transmit a chemical detection signal, from a non-contact chemical sensor, at the detected object, identify composition of the detected object based on an attenuation of the chemical detection signal, determine whether a path change is required based on the identified composition of the detected object, and control one or more actuators to stop a vehicle or adjust the path of the vehicle if the path change is required.

The apparatus may also include the chemical detection sensor configured to transmit the chemical detection signal comprising a millimeter wave signal. The chemical detection signal may be a signal between 30 GHz and 300 GHz.

The computer executable instructions may cause the at least one processor to identify the composition of the detected object based on the reflections of the chemical detection signal by determining whether an attenuation or strength of the reflections of the chemical detection signal within a preset range corresponding to a composition.

The composition may be one from among a gaseous composition, a solid composition and a liquid composition.

The computer executable instructions may cause the at least one processor to determine whether the path change is required based on the identified composition of the detected object by determining whether an attenuation or strength of the reflections of the chemical detection signal is greater than a preset threshold.

The computer executable instructions may cause the at least one processor to control one or more actuator by activating brakes to stop a vehicle if the path change that is required is a vehicle stop.

The computer executable instructions may cause the at least one processor to control one or more actuators by providing an electronic power steering single to direct a vehicle on a modified path if the path change that is required is to drive around the identified object.

The apparatus may include the plurality of sensors including two or more from among a LIDAR, a camera, a sonar, and a radar.

The computer executable instructions may cause the at least one processor to identify the composition of the detected object based on the reflections of the chemical detection signal by comparing a profile of the reflections of the chemical detection signal to a spectral profile corresponding to the composition.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
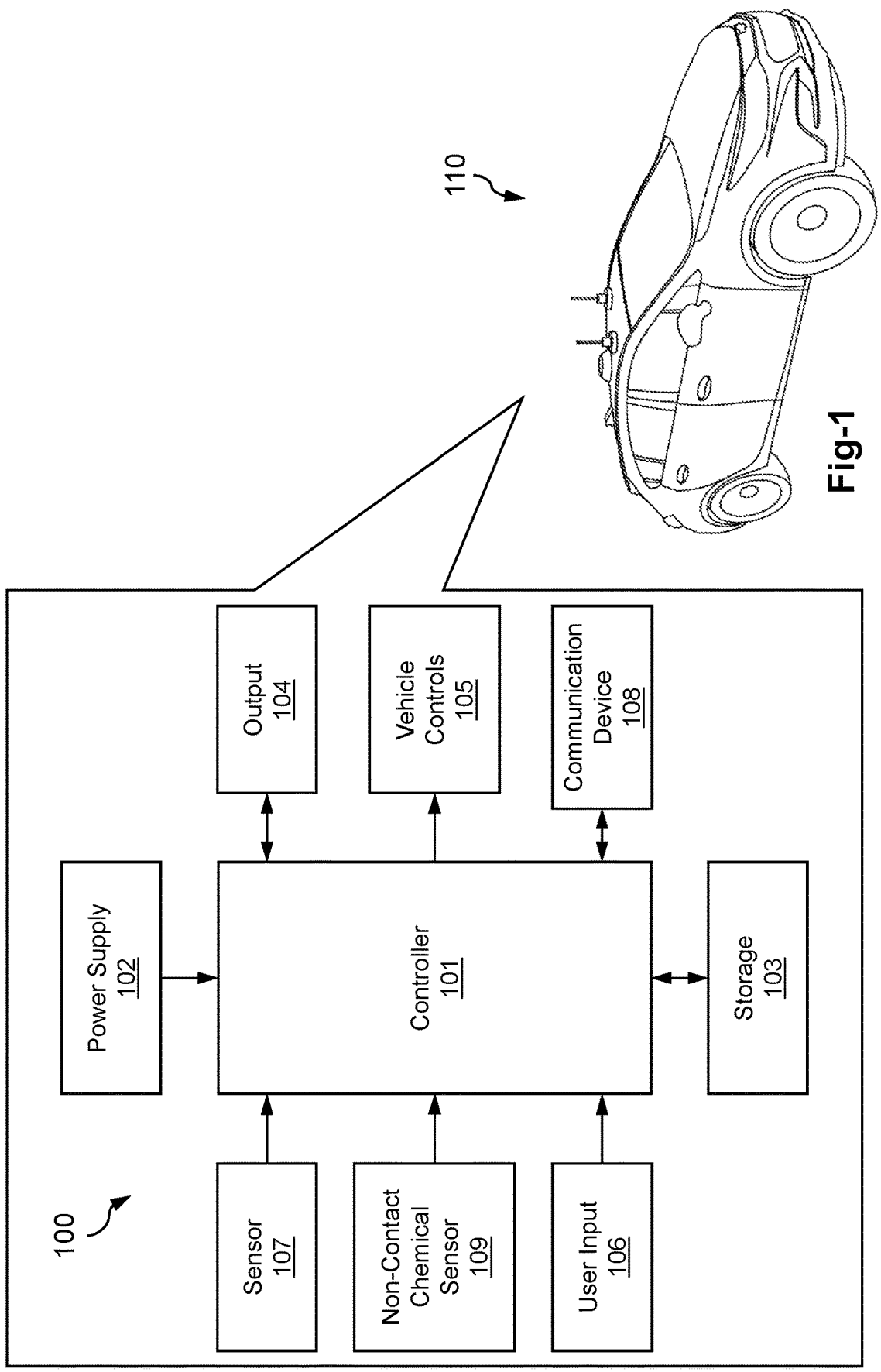
FIG. 1 shows a block diagram of an apparatus that identifies an object using a non-contact chemical sensor according to an exemplary embodiment.

An apparatus and method that identify a composition of an object using a non-contact chemical sensor will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with various automated controls and sensors that can provide information used to determine a position or path of the vehicle and to control a vehicle to follow waypoints to arrive at a destination or maintain its position in road. However, current sensors of vehicles may have difficulty distinguishing between the composition of objects. For example, non-solid objects such as gases and liquids may be detected by sensors. While vehicles may drive through non-solid objects, it may be difficult to differentiate non-solid objects from solid objects using imaging and lidar sensors.

One way to address the issue of differentiating solid objects from gases and liquids is to add a non-contact chemical sensor to a vehicle. The addition of the non-contact chemical sensor will provide additional information that will enable a vehicle to determine that its current path is clear in the case of a non-solid object, such as fog or rain, being detected and continue moving through the path and object. Moreover, the detection of specific types of non-solid objects may be used to deploy certain counter measures such as fog lights in the case of fog, washer fluid and wipers in the case of mud or liquids, etc.

FIG. 1 shows a block diagram of an apparatus that identifies a composition of an object using a non-contact chemical sensor 100. As shown in FIG. 1, the apparatus that identifies a composition of an object using a non-contact chemical sensor 100, according to an exemplary embodiment, includes a controller 101, a power supply 102, a storage 103, an output 104, vehicle controls 105, a user input 106, a sensor 107, a communication device 108, and a non-contact chemical sensor 109. However, the apparatus that identifies a composition of an object using a non-contact chemical sensor 100 is not limited to the aforementioned configuration and may be configured to include additional elements and/or omit one or more of the aforementioned elements. The apparatus that identifies a composition of an object using a non-contact chemical sensor 100 may be implemented as part of a vehicle 110, as a standalone component, as a hybrid between an on vehicle and off vehicle device, or in another computing device.

The controller 101 controls the overall operation and function of the apparatus that identifies a composition of an object using a non-contact chemical sensor 100. The controller 101 may control one or more of a storage 103, an output 104, vehicle controls 105, a user input 106, a sensor 107, a communication device 108, and a non-contact chemical sensor 109 of the apparatus that identifies a composition of an object using a non-contact chemical sensor 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the vehicle controls 105, the user input 106, the sensor 107, the communication device 108, and the non-contact chemical sensor 109 of the apparatus that identifies a composition of an object using a non-contact chemical sensor 100. The information may be sent and received via a bus or network, or may be directly read or written to/from one or more of the storage 103, the output 104, the user input 106, the sensor 107, the communication device 108, and the non-contact chemical sensor 109 of the apparatus that identifies a composition of an object using a non-contact chemical sensor 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the vehicle controls 105, the user input 106, the sensor 107, the communication device 108, and the non-contact chemical sensor 109, of the apparatus that identifies a composition of an object using a non-contact chemical sensor 100. The power supply 102 may include one or more from among a battery, an outlet, a capacitor, a solar energy cell, a generator, a wind energy device, an alternator, etc.

The storage 103 is configured for storing information and retrieving information used by the apparatus that identifies a composition of an object using a non-contact chemical sensor 100. The storage 103 may be controlled by the controller 101 to store and retrieve information received from the controller 101, the vehicle controls 105, the sensor 107, the communication device 108, and/or the non-contact chemical sensor 109. The storage 103 may also store the computer instructions configured to be executed by a processor to perform the functions of the apparatus that identifies a composition of an object using a non-contact chemical sensor 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The information may include path information and/or vehicle information, composition information indicating a composition of one from among a gaseous composition, a solid composition and a liquid composition, spectral information corresponding to preset attenuations or signatures that correspond to a composition, and attenuation information. The vehicle information may include one or more a brake command and a steering command such as an electronic power steering command. The path information may include coordinates of one or more waypoints the vehicle is to follow for a predetermined distance ahead of the vehicle.

The output 104 outputs information in one or more forms including: visual, audible and/or haptic form. The output 104 may be controlled by the controller 101 to provide outputs to the user of the apparatus that identifies a composition of an object using a non-contact chemical sensor 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc. The output 104 may output notification including one or more from among an audible notification, a light notification, and a display notification. The notifications may indicate information about a composition of a detected object, a request to confirm or reject the detected composition of the object, or a request to confirm or reject the vehicle path with respect to the detected object.

The vehicle controls 105 may include vehicle system modules (VSMs) in the form of electronic hardware components that are located throughout the vehicle and typically receive input from one or more sensors and use the sensed input to perform diagnostic monitoring, control the vehicle to perform maneuvers, accelerate, brake, decelerate, report and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions.

As examples, one VSM can be an engine control module (ECM) that controls various aspects of engine operation such as fuel ignition and ignition timing, another VSM can be an external sensor module configured to receive information from sensors 107 such as cameras, radars, LIDARs, and lasers, another VSM can be a powertrain control module that regulates operation of one or more components of the vehicle powertrain, another VSM can be the vehicle dynamics sensor that detects an understeer gradient, torque information, vehicle cornering stiffnesses and suspension compliances, a steering wheel angle parameter, a speed parameter such as a vehicle forward velocity, an acceleration parameter or command, a lateral acceleration parameter, and/or a road wheel angle parameter, and another VSM can be a body control module that governs various electrical components located throughout the vehicle, like the vehicle's power door locks and headlights. As is appreciated by those skilled in the art, the above-mentioned VSMs are only examples of some of the modules that may be used in a vehicle, as numerous others are also available.

The user input 106 is configured to provide information and commands to the apparatus that identifies a composition of an object using a non-contact chemical sensor 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The sensor 107 may include one or more from among a plurality of sensors including a camera, a laser sensor, an ultrasonic sensor, an infrared camera, a LIDAR, a radar sensor, an ultra-short range radar sensor, a sonar, an ultra-wideband radar sensor, and a microwave sensor. The sensor 107 may be configured to scan an area around a vehicle to detect and provide imaging information including an image of the area around the vehicle. The sensor 107 may be used to compile imaging information or mapping information or data including three-dimensional point cloud information.

The communication device 108 may be used by the apparatus that identifies a composition of an object using a non-contact chemical sensor 100 to communicate with various types of external apparatuses according to various communication methods. The communication device 108 may be used to send/receive information including the information on a location of a vehicle, global navigation information, vehicle information, attenuation information, spectral profile information, path information, image sensor information, etc.

The communication device 108 may include various communication modules such as one or more from among a telematics unit, a broadcast receiving module, a near field communication (NFC) module, a GNS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GNS receiver is a module that receives a GNS signal from a GPS satellite or other navigation satellite or tower and that detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The non-contact chemical sensor 109 may include a millimeter wave signal generator and transmitter, and a millimeter wave signal receiver. The chemical detection sensor may be configured to transmit the chemical detection signal including a millimeter wave signal. The non-contact chemical sensor 109 may receive reflections of the chemical detection signal and measure the reflected signal strength, amplitude, and/or attenuation and provide information the controller 101. The chemical detection signal may be a signal between 30 GHz and 300 GHz.

According to an exemplary embodiment, the controller 101 of the apparatus that identifies a composition of an object using a non-contact chemical sensor 100 may be configured to detect an object based on information provided by a plurality of sensors, control to transmit a chemical detection signal, from a non-contact chemical sensor, at the detected object, identify composition of the detected object based on an attenuation of the chemical detection signal, determine whether a path change is required based on the identified composition of the detected object, and control one or more actuators to stop a vehicle or adjust the path of the vehicle if the path change is required.

The controller 101 of the apparatus that identifies a composition of an object using a non-contact chemical sensor 100 may be further configured to identify the composition of the detected object based on the reflections of the chemical detection signal by determining whether an attenuation or strength of the reflections of the chemical detection signal within a preset range corresponding to a composition.

The controller 101 of the apparatus that identifies a composition of an object using a non-contact chemical sensor 100 may be configured to determine whether the path change is required based on the identified composition of the detected object by determining whether an attenuation or strength of the reflections of the chemical detection signal is greater than a preset threshold.

The controller 101 of the apparatus that identifies a composition of an object using a non-contact chemical sensor 100 may be configured to control one or more actuator by activating brakes to stop a vehicle if the path change that is required is a vehicle stop.

The controller 101 of the apparatus that identifies a composition of an object using a non-contact chemical sensor 100 may be configured to control one or more actuators by providing an electronic power steering single to direct a vehicle on a modified path if the path change that is required is to drive around the identified object.

The controller 101 of the apparatus that identifies a composition of an object using a non-contact chemical sensor 100 may be configured identify the composition of the detected object based on the reflections of the chemical detection signal by comparing a profile of the reflections of the chemical detection signal to a spectral profile corresponding to the composition.

Figure 2:
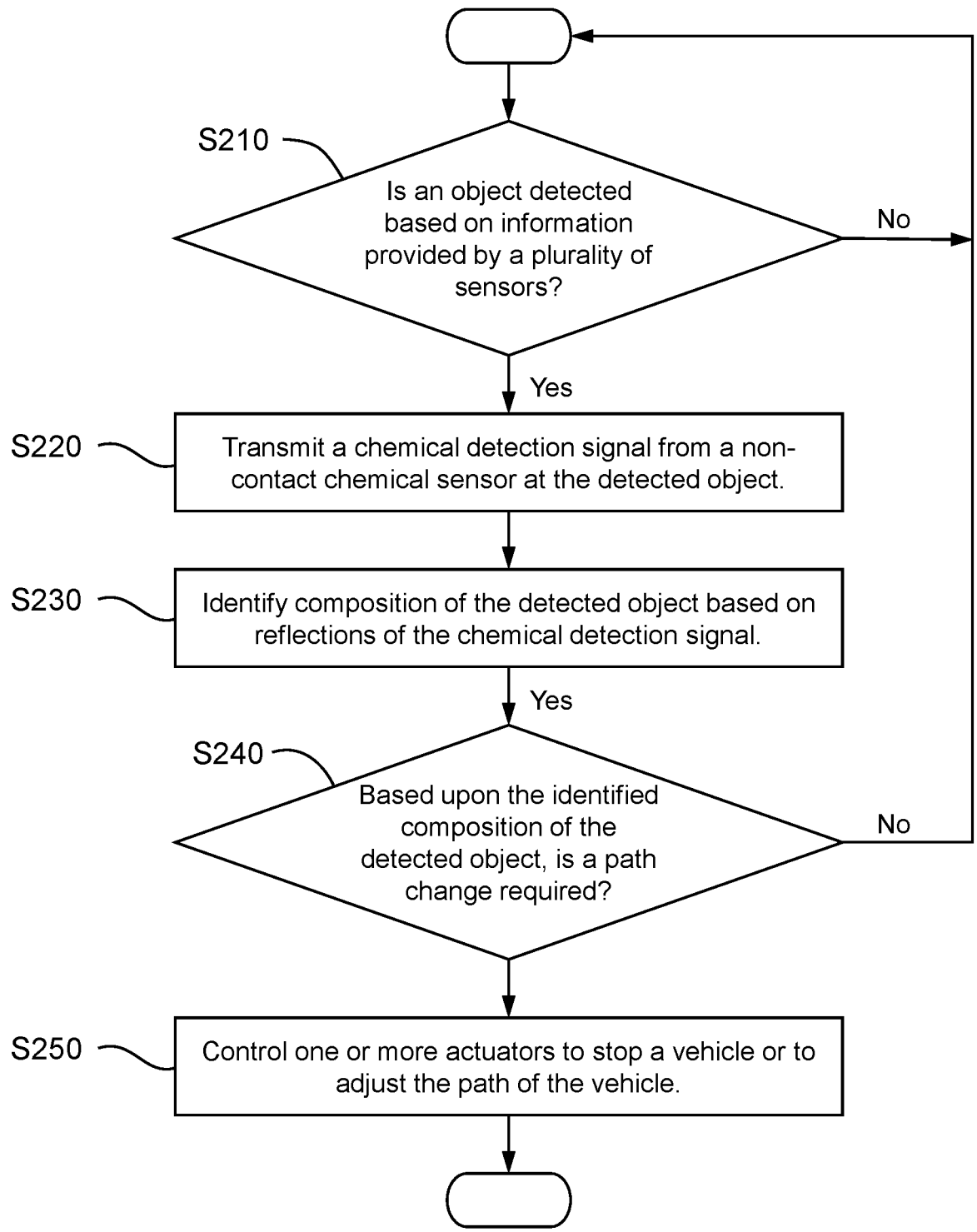
FIG. 2 shows a flowchart for a method identifies an object using a non-contact chemical sensor according to an exemplary embodiment.

FIG. 2 shows a flowchart for a method identifies an object using a non-contact chemical sensor according to an exemplary embodiment. The method of FIG. 2 may be performed by the apparatus that identifies an object using a non-contact chemical sensor 100 or may be encoded into a computer readable medium as instructions that are executable by a computer to perform the method.

Referring to FIG. 2, an object is detected based on information provided by a plurality of sensors in operation S210. In response to the object being detected (operation S210—Yes), a chemical detection signal, from a non-contact chemical sensor, is transmitted at the detected object in operation S220. The object composition is identified in operation S230 based on reflections of the non-contact chemical sensor signal. Attenuation, signal strength, spectral information or other signal signature may be used to identify the composition of the detected object. Based on the identified composition, it is determined whether a path change is required in operation S240. If a path change is required (operation S240—Yes), one or more actuators are controlled to stop a vehicle or adjust the path of the vehicle in operation S250.

Figure 3:
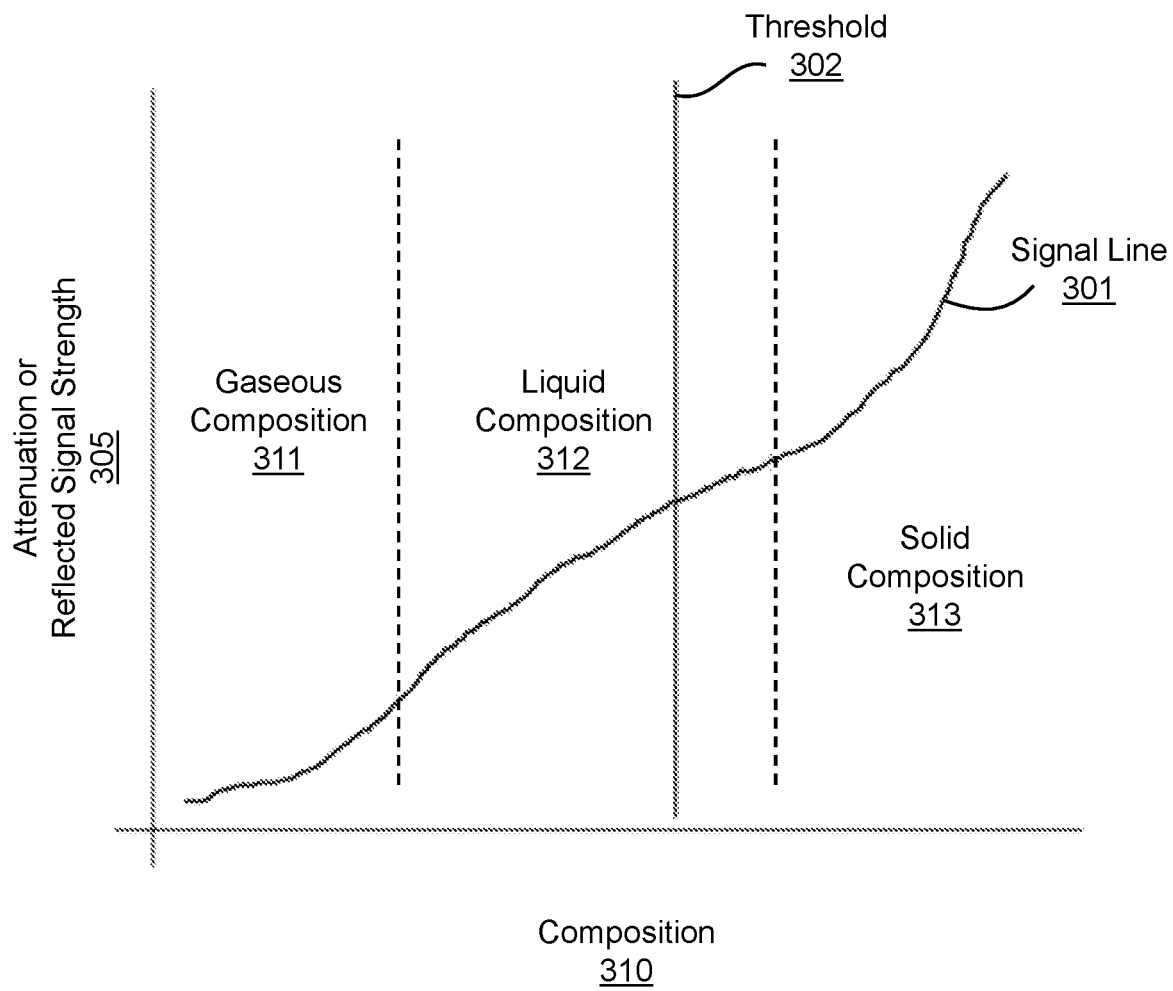
FIG. 3 shows a graph of a reflection of a signal of the non-contact chemical sensor as it corresponds to the composition of an object according to an aspect of an exemplary embodiment.

FIG. 3 shows a graph of attenuation of the non-contact chemical sensor as it corresponds to the composition of an object according to an aspect of an exemplary embodiment.

Referring to FIG. 3, non-contact chemical sensor signal line 301 represents the relationship between attenuation or reflected signal strength 305 of the non-contact chemical sensor signal shown on the vertical axis and the composition 310 of an object shown on the horizontal axis. There are three zones that respectively correspond to a gaseous composition 311, a liquid composition 312 and a solid composition 313. Threshold 302 represents a predetermined or calibrated threshold that demarcates the line between a solid and a non-solid composition (i.e., liquid or gaseous). In addition, spectral information from a reflected chemical detection signal in the form of a signature corresponding to the strength, frequency, phase, or other characteristics of the reflections of chemical detection signal may be used to determine which zone the signal falls within or which composition the non-contact chemical sensor signal is detecting.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method that identifies a composition of an object using a non-contact chemical sensor, the method comprising:

detecting an object based on information provided by a plurality of sensors, wherein the plurality of sensors comprises two or more of a LIDAR, a camera, a sonar, or a radar;

in response to the object being detected, transmitting a chemical detection signal, from a non-contact chemical sensor, at the detected object, wherein the chemical detection signal is a millimeter wave signal having a frequency between 30 GHz and 300 GHz;

identifying a composition of the detected object based on reflections of the chemical detection signal by comparing a profile of the reflections of the chemical detection signal to a spectral profile corresponding to the composition;

determining whether a path change is required based on the identified composition of the detected object; and controlling one or more actuators to stop a vehicle or to adjust the path of the vehicle if the path change is required.

2. The method of claim 1, wherein the identifying the composition of the detected object based on the reflections of the chemical detection signal comprises determining whether an attenuation or strength of the reflections of the chemical detection signal within a preset range corresponding to a gaseous composition, a liquid composition, or a solid composition.

3. The method of claim 1, wherein the composition comprises one from among a gaseous composition, a solid composition and a liquid composition.

4. The method of claim 1, wherein the determining whether the path change is required based on the identified composition of the detected object comprises determining whether an attenuation or strength of the reflections of the chemical detection signal is greater than a preset threshold that demarcates a line between a non-solid composition and a solid composition.

5. The method of claim 4, wherein the controlling one or more actuators comprises activating brakes to stop a vehicle if the path change that is required is a vehicle stop.

6. The method of claim 4, wherein the controlling one or more actuators comprises providing an electronic power steering single to direct a vehicle on a modified path if the path change that is required is to drive around the identified object.

7. An apparatus that identifies a composition of an object using a non-contact chemical sensor, the apparatus comprising:
   a plurality of sensors comprising two or more of a LIDAR, a camera, a sonar, or a radar;
   a non-contact chemical sensor including a millimeter wave signal generator and transmitter and a millimeter wave signal receiver;
   at least one memory comprising computer executable instructions; and
   at least one processor configured to read and execute the computer executable instructions, the computer executable instructions causing the at least one processor to:
      detect an object based on information provided by the plurality of sensors;
      control to transmit a chemical detection signal, from the non-contact chemical sensor, at the detected object, wherein the chemical detection signal is a millimeter wave signal having a frequency between 30 GHz and 300 GHz;
      identify a composition of the detected object based on reflections of the chemical detection signal by comparing a profile of the reflections of the chemical detection signal to a spectral profile corresponding to the composition;
      determine whether a path change is required based on the identified composition of the detected object; and
      control one or more actuators to stop a vehicle or adjust the path of the vehicle if the path change is required.

8. The apparatus of claim 7, wherein the computer executable instructions cause the at least one processor to identify the composition of the detected object based on the reflections of the chemical detection signal by determining whether an attenuation or strength of the reflections of the chemical detection signal fall within a preset range corresponding to a gaseous composition, a liquid composition, or a solid composition.

9. The apparatus of claim 7, wherein the composition comprises one from among a gaseous composition, a solid composition and a liquid composition.

10. The apparatus of claim 7, wherein the computer executable instructions cause the at least one processor to determine whether the path change is required based on the identified composition of the detected object by determining whether an attenuation or strength of the reflections of the chemical detection signal is greater than a preset threshold that demarcates a line between a non-solid composition and a solid composition.

11. The apparatus of claim 10, wherein the computer executable instructions cause the at least one processor to control one or more actuator by activating brakes to stop a vehicle if the path change that is required is a vehicle stop.

12. The apparatus of claim 10, wherein the computer executable instructions cause the at least one processor to control one or more actuators by providing an electronic power steering single to direct a vehicle on a modified path if the path change that is required is to drive around the identified object.

* * * * *